252-99     CROSS REFERENCE     EXAMINER

United States Patent Office 3,149,151
Patented Sept. 15, 1964

3,149,151
PER-COMPOUNDS OF ACYLATION PRODUCTS OF PHOSPHOROUS ACID
Joachim Schiefer, Dusseldorf, Friedrich Weldes, Haan, Rhineland, and Karl-Heinz Worms, Dusseldorf, Germany, assignors to Henkel & Cie, G.m.b.H., Dusseldorf-Holthausen, Germany
No Drawing. Filed Mar. 14, 1961, Ser. No. 95,497
Claims priority, application Germany Mar. 22, 1960
1 Claim. (Cl. 260—502)

It has been found that novel and technologically valuable per-compounds of acylation products of phosphorous acid are obtained by reacting the alkali salts of acylation products of phosphorous acid with hydrogen peroxide.

The reaction can be carried out in such a manner that the alkali salts of the acylated phosphorous acid are mixed, in solid form or as an aqueous solution, with a hydrogen peroxide solution, and the excess water removed by evaporation.

It is of distinct advantage to effect the reaction at temperatures below 50° C. in order to avoid hydrogen peroxide losses. It also is useful to accomplish the evaporation of the excess water under mild conditions, i.e., at temperatures not exceeding 50° C., and preferably at approximately 20° C.

The acylation products of phosphorous acid, which are to be employed in the form of their alkali salts, such as sodium or potassium salts, can be produced by a number of conventional methods (Beilstein, Handbuch der organischen Chemie, 4th ed., vol. 2, pp. 171–172; JACS 34, 492–499). Depending upon the methods used, the acylated phosphorous acids are obtained in pure form or in the form of mixtures. For the manufacture of the novel per-compounds particularly such products are used as organic starting materials whose production is carried out by reaction of phosphorous acid with acetic anhydride, acetyl chloride or mixtures thereof. In lieu of the last named materials, the reaction products of propionyl chloride, propionic acid anhydride, butyryl chloride, butyric acid anhydride, valeryl chloride, valeric acid anhydride, caproyl chloride, caproic acid anhydride with phosphorous acid also can be employed.

As far as is known from the investigations to date, the acylation products of phosphorous acid all have the formula

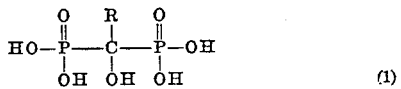

(1)

wherein R is an alkyl radical selected from the group consisting of methyl-, ethyl-, propyl-, butyl- and pentyl radicals.

The products thus obtained easily are converted into their corresponding acid or neutral potassium or sodium salts by means of the corresponding alkaline agents.

In carrying out the process according to the invention, it is advantageous to use $H_2O_2$-solutions whose concentration is at least 30 percent by weight. It is useful to calculate the amounts $H_2O_2$ employed on the phosphorous present in the alkali salts of the acylation products of the phosphorous acid. Per gram atom phosphorous, 1–4 mols $H_2O_2$ are used. If desired, an even higher excess $H_2O_2$ can be employed, however, no significant technological advantages are attained thereby. Using the starting materials in a ratio of 1:1, calculated in the above manner, or using a slight excess $H_2O_2$, the per-compound produced contains approximately one gram atom active oxygen per gram atom phosphorus. When the hydrogen peroxide solution is used in an excess, the active oxygen content in the reaction product rises and reaches a maximum value of 2 per gram atom phosphorus. However, these values only are attained when the reaction is carried out under mild operating conditions since, otherwise, losses on active oxygen may occur. Products used in practice, however, need not necessarily have the maximum active oxygen content.

The novel per-compounds also can be manufactured in such a manner that the hydrogen peroxide solution is added to the solid component. Addition of the $H_2O_2$ solution can be accomplished in portions or continuously. Such a reaction is carried out with particular advantage in a kneader or equivalent equipment, e.g., in an agitator. By using this process, it is useful to employ $H_2O_2$ solutions of comparatively high concentrations, i.e., up to 70 percent by weight. The reaction product is removed from the kneader or agitator while still damp and thereafter is dried carefully at temperatures below 50° C. This manner of manufacture is particularly useful as a continuous process.

It furthermore is feasible to manufacture the novel products by spraying a hydrogen peroxide solution on solid alkali salts of acylation products of phosphorous acid and subsequent drying.

Finally, instead of the alkali salts of the acylation products of phosphorous acid, in part or in toto the free acid plus the corresponding quantity alkali can be used. As alkalies, particularly sodium hydroxide, potassium hydroxide, sodium carbonate, potassium carbonate and sodium bicarbonate are applicable. A preferred embodiment of the process consists in first mixing the free acid with the hydrogen peroxide solution and adding the alkali afterward. It thereby is advantageous to neutralize the acid groups of the acylation product of phosphorous acid only partly because the reaction product, due to its slight solubility, precipitates from the solution. In general, the most favorable range is within a pH of 7 to 8.5. The separated reaction product is filtered or centrifuged and subsequently dried.

The novel per-compounds thus produced are stable in solid form without addition of a stabilizer and can be stored for prolonged periods of time without substantially losing oxygen. They are easily dissolved in water and can be employed in bleaching, rinsing, cleansing agents and in penetrants, if desired in mixture with other, conventional agents, such as phosphates, soda, waterglass and detergents.

The invention now will be further illustrated by the following examples. However, it should be understood that these are given merely by way of explanation, not of limitation, and that numerous changes may be made in the details without departing from the spirit and the scope of the invention as hereinafter claimed.

EXAMPLE 1

Acetic anhydride and phosphorous acid, in a molar ratio of 1.1:1, are reacted at approximately 80° C. The reaction product is separated, and its acid groups neutralized to a pH of 11 with sodium hydroxide. 50 g. each of the above sodium salt of an acylation product of phosphorous acid are reacted with a 35 percent by weight $H_2O_2$ solution in proportions of 1 to 4 mols $H_2O_2$ (100%) per gram atom phosphorus in the organic component. This corresponds to 28 g., 56 g., 84 g. and 112 g., respectively, 35% $H_2O_2$ solution per reaction. The reaction mixture then is concentrated and the water evaporated in a vacuum of 5 mm. Hg. at 20° C. and 50° C., respectively, as shown below in Table 1, which also gives the active oxygen content of the per-compounds of acylation products of phosphoric acid thus prepared.

When the per-compounds listed in Table 1 are treated with organic solvents, e.g., methanol or acetone, only slight losses on active oxygen occur (at a maximum 14 percent, calculated on the total quantity). This indicates that true per-compounds have been obtained.

*Table 1*

| Mols H₂O₂ per Gram Atom P | Drying Temp., °C. | Proportion active O to Gram Atom P in Per-compound | Percent by weight active O |
| --- | --- | --- | --- |
| 1:1 | 20 | 0.83 | 7.12 |
| 2:1 | 20 | 1.19 | 9.46 |
| 3:1 | 20 | 1.40 | 10.63 |
| 4:1 | 20 | 1.67 | 12.57 |
| 1:1 | 50 | 0.68 | 6.15 |
| 2:1 | 50 | 0.97 | 8.42 |
| 3:1 | 50 | 1.19 | 9.74 |
| 4:1 | 50 | 1.24 | 10.32 |

EXAMPLE 2

100 g. each of an acylation product of phosphorous acid, as in Example 1, which, however, is used in form of the potassium salt instead of the sodium salt, are reacted with 45 and 180 ml., respectively, 35 percent by weight H₂O₂ solution at 25° C. and then evaporated to dryness in a vacuum of approximately 5 mm. Hg at 25° C. over P₂O₅. White crystalline per-compounds result therefrom whose active oxygen content is listed in Table 2.

*Table 2*

| Mols H₂O₂ per Gram Atom P | Drying Temp., °C. | Proportion active O to Gram Atom P in Per-compound | Percent by weight active O |
| --- | --- | --- | --- |
| 1:1 | 25 | 0.94 | 7.31 |
| 1:4 | 25 | 1.51 | 10.80 |

EXAMPLE 3

Propionic acid anhydride is reacted with phosphorous acid in a molar ratio of 2:1 at approximately 145° C., and the acid groups of the reaction product neutralized to a pH of 11.0 with sodium hydroxide. 100 g. of the sodium salt of an acylation product of phosphorous acid thus prepared are mixed at 20° C. with 45 g. 35% (by weight) H₂O₂ solution (corresponding to 1 mol 100% H₂O₂ per gram atom phosphorus), and subsequently the water is evaporated at the same temperature in a vacuum of 5 mm. Hg and the product dried over P₂O₅. The active oxygen content of the per-compound thus obtained is 7.2 percent, corresponding to a proportion of active oxygen to gram atoms phosphorus of 0.98:1.

EXAMPLE 4

Acetic anhydride is reacted with phosphorous acid as described in Example 1. However, the reaction product is not reacted with an alkali, so that, after refining, the corresponding acid is obtained in crystalline form having a content of phosphorus of 26.5 percent by weight and of carbon of 11.3 percent by weight.

100 g. of this product are dissolved in 95 g. hydrogen peroxide solution (31% by weight H₂O₂), corresponding to 1 mol H₂O₂ per gram atom phosphorus. Then, 111 g. 50 percent aqeous NaOH are added (corresponding to 1.6 mols solid NaOH per gram atom phosphorus) while cooling. The pH at that point is 7.5–8.0. After allowing to stand for a short time, the per-compound of the acid sodium salt of the acetylated phosphorous acid separates in form of a solid mass which, after drying in vacuo at 5 mm. Hg contains approximately 7.6 percent active oxygen.

EXAMPLE 5

A per-compound prepared according to Example 1, was stored under exclusion of moisture for a prolonged period of time at 22–24° C. Its initial active oxygen content was 10.6 percent by weight. The loss on peroxide oxygen calculated on the originally present amount (=100), is shown in Table 3.

*Table 3*

| Storage time, Months | Loss of Active Oxygen, Weight percent |
| --- | --- |
| 1 | 3.74 |
| 2 | 6.40 |
| 3 | 8.10 |
| 4.5 | 8.41 |
| 6 | 9.5 |

The loss, hence, amounted to approximately 10 percent of the initial active oxygen content within one-half year.

EXAMPLE 6

Caproic acid anhydride is reacted with phosphorous acid in molar ratio 1.5:1 at a temperature of approximately 140° C. After the reaction a mixture of capronic acid and caproic acid anhydride is separated by distillation. The reaction product, which remains, is neutralized with caustic soda solution to a pH value of 7.

100 g. of the sodium salt of an acylation product of phosphorous acid so prepared are reacted at 40° C. with 110 ml. of hydrogen peroxide solution (35 percent by weight) and then evaporated to dryness in a vacuum of approximately 10 mm. Hg at 45° C.

The active oxygen content of the powdery per-compound thus obtained is 7.1 percent.

We claim as our invention:

Solid per-compounds prepared by reacting an alkali metal salt of a substance having the formula

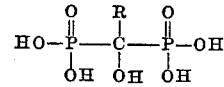

wherein R is an alkyly radical selected from the group consisting of methyl, ethyl, propyl, butyl and pentyl radicals with an aqueous solution of hydrogen peroxide of at least 30 percent by weight at temperatures below 50° C., in proportions of 1 to 4 mols H₂O₂ per gram atom phosphorus in said alkali metal salt, and evaporating the excess water in vacuo; said per-compounds having an active oxygen content of substantially 6 to 11 percent by weight.

References Cited in the file of this patent

UNITED STATES PATENTS

| | | |
| --- | --- | --- |
| 1,914,311 | Vieweg | June 13, 1933 |
| 1,914,312 | Vieweg | June 13, 1933 |
| 2,765,279 | Nusslein | Oct. 2, 1956 |
| 3,055,897 | Schwartz et al. | Sept. 25, 1962 |

FOREIGN PATENTS

| | | |
| --- | --- | --- |
| 140,185 | Austria | Jan. 10, 1935 |
| 355,016 | Great Britain | Aug. 20, 1931 |

OTHER REFERENCES

Husain et al.: Trans. Faraday Soc., vol. 24, 1928, pages 235–239.

Van Wazer, "Phosphorus and its Compounds," vol. I, 1958, page 824.